US009177491B2

(12) United States Patent
Azzalin et al.

(10) Patent No.: US 9,177,491 B2
(45) Date of Patent: Nov. 3, 2015

(54) SEALING DEVICE

(75) Inventors: Graziano Azzalin, Oleggio (IT); Marco Sironi, Laveno Mombello (IT); Marcello Barboni, Genoa (IT); Paolo Timossi, Arquata Scrivia (IT)

(73) Assignee: THE EUROPEAN UNION, REPRESENTED BY THE EUROPEAN COMMISSION (BE)

( * ) Notice: Subject to any disclaimer, the term of this patent is extended or adjusted under 35 U.S.C. 154(b) by 310 days.

(21) Appl. No.: 13/130,598

(22) PCT Filed: Oct. 29, 2009

(86) PCT No.: PCT/EP2009/064249
§ 371 (c)(1), (2), (4) Date: Aug. 3, 2011

(87) PCT Pub. No.: WO2010/057752
PCT Pub. Date: May 27, 2010

(65) Prior Publication Data

US 2011/0279236 A1 Nov. 17, 2011

(30) Foreign Application Priority Data

Nov. 21, 2008 (EP) .................................... 08169703

(51) Int. Cl.
*G05B 19/00* (2006.01)
*G08B 13/14* (2006.01)
*G09F 3/03* (2006.01)

(52) U.S. Cl.
CPC ............ *G09F 3/0329* (2013.01); *G09F 3/0335* (2013.01); *G09F 3/0358* (2013.01); *G09F 3/0376* (2013.01)

(58) Field of Classification Search
CPC ... G09F 3/0329; G09F 3/0335; G09F 3/0358; G09F 3/0376
USPC .................. 340/10.1–10.5, 542, 568.1; 73/35
See application file for complete search history.

(56) References Cited

U.S. PATENT DOCUMENTS 5,656,996 A * 8/1997 Houser ......................... 340/541
6,420,971 B1 * 7/2002 Leck et al. .................... 340/542

(Continued)

FOREIGN PATENT DOCUMENTS

EP 1063627 A2 * 12/2000 ................ G09F 3/03
EP 1826422 A1 * 8/2007 ............. F16B 41/00
WO 2004053626 A2 6/2004

OTHER PUBLICATIONS

International Search Report PCT/EP2009/064249; Dated Jan. 18, 2010.

*Primary Examiner* — Amine Benlagsir
*Assistant Examiner* — Royit Yu
(74) *Attorney, Agent, or Firm* — Cantor Colburn LLP

(57) ABSTRACT

A sealing device including a housing and a closure member having a first end and a second end, at least one of the first and second ends being removably attached to the housing, the housing having means for checking the integrity of the closure member and a first transponder for transmitting information on the status of the sealing device where, the sealing device further includes a second transponder, preferably a passive transponder, associated with at least one of the first and second ends (16, 20) of the closure member, the second transponder comprising a second identity, and a transponder reader associated with the first transponder, preferably an active transponder, the transponder reader being arranged for reading the second identity of the second transponder; the first transponder being configured for receiving the second identity from the transponder reader and for transmitting the second identity.

13 Claims, 1 Drawing Sheet

(56) References Cited

U.S. PATENT DOCUMENTS

| | | | | |
|---|---|---|---|---|
| 7,471,203 | B2 * | 12/2008 | Worthy et al. | 340/572.1 |
| 7,474,209 | B2 * | 1/2009 | Marsilio et al. | 340/568.1 |
| 7,878,561 | B2 * | 2/2011 | Rietzler | 292/307 R |
| 8,068,027 | B2 * | 11/2011 | Auerbach et al. | 340/542 |
| 2005/0099292 | A1 * | 5/2005 | Sajkowsky | 340/539.13 |
| 2005/0231365 | A1 * | 10/2005 | Tester et al. | 340/568.1 |
| 2006/0152366 | A1 * | 7/2006 | Sironi et al. | 340/572.1 |
| 2006/0240807 | A1 * | 10/2006 | Masquelier | 455/412.2 |
| 2006/0261959 | A1 * | 11/2006 | Worthy et al. | 340/572.8 |
| 2007/0024066 | A1 * | 2/2007 | Terry et al. | 292/327 |
| 2007/0120381 | A1 * | 5/2007 | Ehrensvard et al. | 292/307 R |
| 2007/0200372 | A1 * | 8/2007 | Navarsky | 292/351 |
| 2008/0001705 | A1 * | 1/2008 | Kritt et al. | 340/5.31 |
| 2008/0036596 | A1 * | 2/2008 | Auerbach et al. | 340/542 |
| 2008/0238669 | A1 * | 10/2008 | Linford | 340/542 |
| 2008/0256991 | A1 * | 10/2008 | Goldman | 70/57.1 |
| 2008/0315596 | A1 * | 12/2008 | Terry et al. | 292/327 |
| 2009/0072554 | A1 * | 3/2009 | Arguin | 292/327 |
| 2009/0235700 | A1 * | 9/2009 | Sironi et al. | 70/158 |
| 2012/0168521 | A1 * | 7/2012 | Jones et al. | 235/492 |
| 2012/0186308 | A1 * | 7/2012 | Garthe | 70/35 |

* cited by examiner

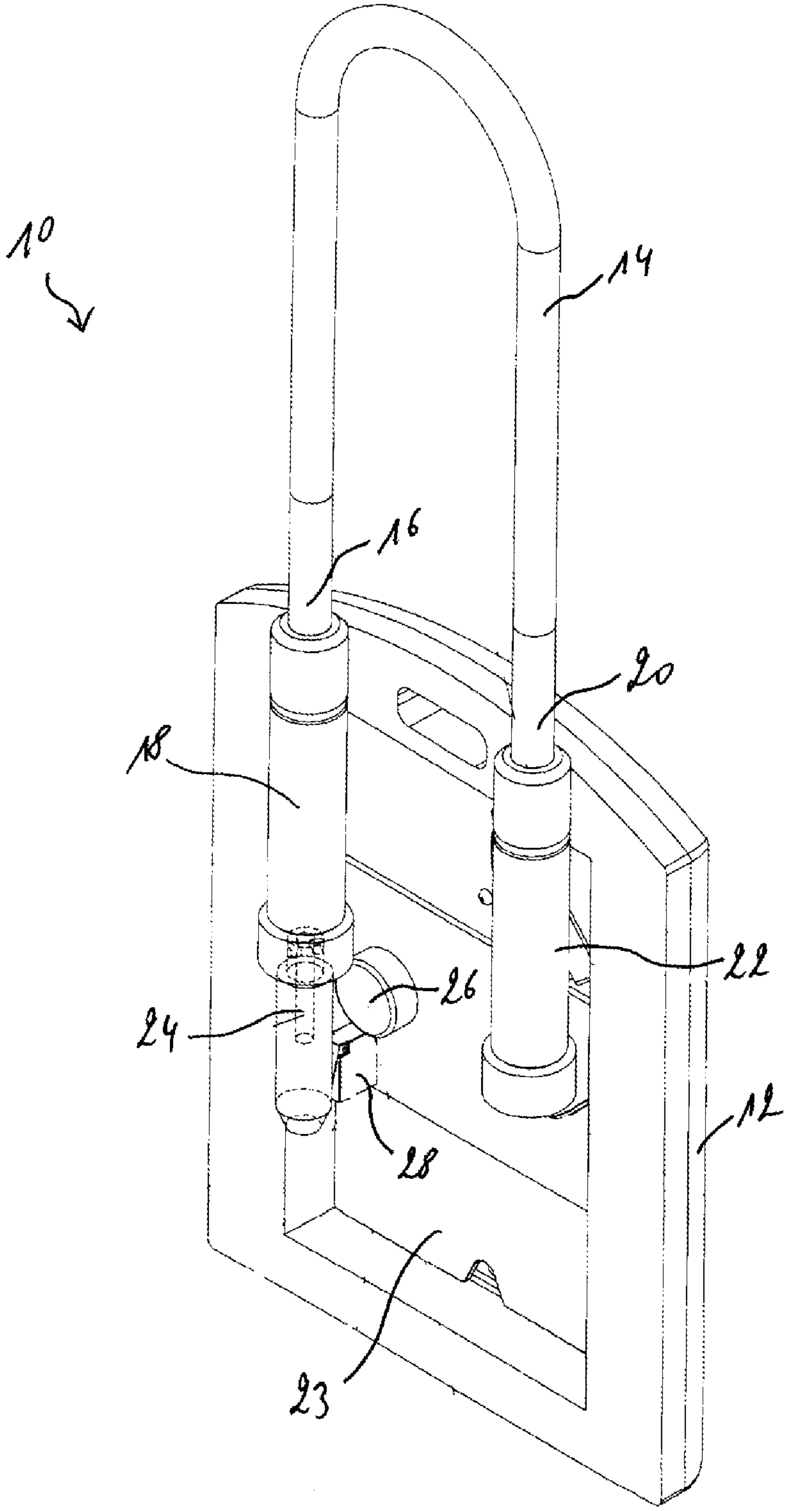
10
14
16
20
18
22
26
24
12
28
23

SEALING DEVICE

TECHNICAL FIELD

The present invention relates to a sealing device, in particular for a commercial container.

BACKGROUND

The sealing of containers is often necessary for security reasons. Secure sealing of a container is of particular importance in case the container holds dangerous substances, such as for example fissile materials. It is further important to be able to easily identify the container and thereby its contents. Sealing devices are therefore often provided with identification elements. In an effort to increase security of the seal, such identification elements are often concealed and difficult to tamper with. As a result, such sealing devices can become rather expensive to produce. Furthermore, it is often difficult to verify if the sealing device has been correctly installed and if, and particularly when, it has been tampered with or broken. Depending on the contents of the container, it can be of great importance to be quickly informed of an illegal opening of the container.

It should be noted that the use of such sealing device is not limited to the shipment or storage of dangerous substances. There is also a need to use sealing devices on containers containing valuable cargo, such as e.g. electrical goods, cars, jewelry or even goods of personal value.

An example of a known sealing device is shown in patent application EP 1 063 627, which describes a sealing device with a housing and closure wire connected, when sealed, at both ends with the housing. The closure wire comprises two free ends which, when connected to the housing, establish an optical connection between a sender and a receiver connected to a microprocessor. When the closure wire is cut, the optical connection between sender and receiver is disrupted and the cutting of the closure wire is detected. The sealing device further comprises an infrared transmitter for transmitting status information to an external reader. In order to maintain the closure wire connected to the housing, a lock mechanism with a lock pin is suggested. The closure wire cannot be freed from the housing unless the lock pin is cut. However, if the lock pin and/or the closure wire are then replaced after an unauthorised access, such access may not be detectable.

There is hence a need to further improve the security of such sealing devices.

BRIEF SUMMARY

The invention provides an improved sealing device, which allows to easily and quickly the integrity of the sealing device.

The present invention proposes a sealing device comprising a housing and a closure member having a first end and a second end, at least one of the first and second ends being removably attached to the housing, the housing comprising means for checking the integrity of the closure member and a first transponder for transmitting information on the status of the sealing device. According to an important aspect of the invention, the sealing device further comprises a second transponder, preferably a passive transponder, associated with at least one of the first and second ends of the closure member, the second transponder comprising a second identity, and a transponder reader associated with the first transponder, preferably an active transponder, the transponder reader being arranged for reading the second identity of the second transponder; the first transponder being configured for receiving the second identity from the transponder reader and for transmitting the second identity.

Due to the second identity of the second transponder, which is collected by the first transponder and transferred to a reading device, the closure member can be identified. Therefore, even if after an unauthorised opening of the sealing device the broken closure element has been replaced with a new one, such replacement is detectable because the new closure element will not have the same identity as the original closure element. A violation of the sealing device can hence still be detected even if considerable effort has gone into trying to conceal the violation.

Advantageously, the first transponder comprises a first identity, wherein the first transponder is configured for transmitting the first identity. The first identity of the first transponder, which is associated with the housing, can thereby be linked to the second identity of the second transponder, which is associated with the closure element. Hence a closure element can be associated with its housing. Any replacement of either the housing or the closure element can be determined by verifying the first and second identities. Such a sealing device provides a univocal identification of the housing and the closure member, and therefore also of the sealing device.

Preferably, the closure member comprises a flexible cable having a core therein. The use of a flexible cable allows feeding the closure element through apertures of common closing means of any container doors. The sealing device according to the present invention is hence applicable on any known containers, without the necessity of modifying any container doors or their closing means. The core within the cable may be used to check the integrity of the cable.

According to a first embodiment of the invention, the core comprises an optical fibre and the means for checking the integrity of the closure member comprises an optical emitter arranged to emit an optical signal into the optical fibre and an optical detector arranged to detect a signal from the optical fibre. If the cable is cut, the optical path from one end of the cable to the other is broken. The optical detector is no longer able to receive the optical signal sent by the optical emitter. The means for checking the integrity of the cable interprets the lack of optical signal as a violation of the sealing device by cutting the cable. It should be noted that it is not possible to bridge or short-circuit the location where the cable is cut to fool the means for checking into believing that the cable is intact.

According to a second embodiment of the invention, the core comprises an electrical conductor and the means for checking the integrity of the closure member comprises a first electrical terminal connected to the core at a first end of the cable and a second electrical terminal connected to the core at a second end of the cable. An electric current is sent from one terminal to another. If such electric current is no longer able to travel through the cable, from one end to the other, the means for checking the integrity interprets this as a violation of the sealing device.

The housing preferably further comprises means for checking correct installation of the first and/or second end of the closure member. Such means for checking correct installation may e.g. comprise a microswitch. A control signal is only emitted by the microswitch if the closure member has been correctly connected to the housing. The operator therefore knows whether or not the sealing device is correctly installed before allowing the container to be transported. The operator can then rectify the situation if needed. Preferably, the first transponder is configured so as to only provide feedback once a control signal confirming correct installation has been received from the microswitch.

Advantageously, the housing further comprises memory means for recording data collected from the second transponder and/or the first transponder and/or the means for checking the integrity and/or the means for checking correct installation. Should the sealing device not be within operating distance of a reading device, any event of the sealing device may be recorded in the memory means fur subsequent transmittal to a reading device. Any authorised an unauthorised event can be logged for further use.

According to one embodiment of the invention, the first end of the closure member may be removably attached to the housing and the second end of the closure member may be fixedly attached to the housing, the first end of the closure member comprising the second transponder. It is generally not necessary to have both ends of the closure member removed from the housing for installation. Therefore, one end of the closure member may be fixedly connected to the housing. This eliminates any potential installation errors of the fixedly connected end of the closure element as this end is always properly installed. It is then only necessary to check the proper installation of the other end of the closure element. Only one microswitch is therefore necessary.

It should be noted that the sealing device preferably further comprises lock means for releasing the removably connected end(s) of the closure element from the housing. Such lock means may comprise any known security features such as a key, a number combination, an electronic means. Multiple authorised openings of the seal are thereby possible without destroying the sealing device. After the container has reached its destination, the sealing device can be removed and used again for another shipment.

The first transponder may comprise encryption and/or decryption means for encrypting a signal sent to a reading device or decrypting a signal received from a reading device.

BRIEF DESCRIPTION OF THE DRAWINGS

The present invention will be more apparent from the following description of a not limiting embodiment with reference to the attached drawing, wherein FIG. 1 shows a schematic cut through a sealing device according to the invention.

DETAILED DESCRIPTION

FIG. 1 shows a sealing device 10 comprising a housing 12 and a closure member 14 in the form of a flexible cable with a core (not shown) therein. The cable 14 has a first end 16 with a first connection pin 18 received in the housing 12 and an opposite second end 20 with a second connection pin 22 received in the housing 12. The housing comprises lock means (not shown) for locking the first and second connection pins 18, 22 in place once connected to the housing 12. The sealing device 10 comprises a first transponder 23, preferably an active transponder, arranged within the housing 12 for relaying information on the status of the sealing device 10 to a reading device.

According to the present invention, a second transponder 24, preferably a passive transponder, with a second identity is associated with the first end 16 of the cable 14. To this effect, the second transponder 24 is mounted on the free end of the first connection pin 18. A transponder reader 26 is arranged in the housing 12 so as to be able to read, when the first connection pin 18 is correctly installed in the housing 12, the second identity of the second transponder 24. Correct installation of the first connection pin 18 can be verified by a microswitch 28, which produces a signal only if the first connection pin 18 is correctly installed.

The sealing device 10 further comprises means for checking the integrity of the cable 14.

According to one embodiment of the invention, the core in the cable comprises an optical fibre and the means for checking the integrity of the closure member comprises an optical emitter (not shown) and an optical detector (not shown). The optical emitter is arranged at one end of the cable 14 to emit an optical signal into the optical fibre within the cable. The optical detector is arranged at the opposite end of the cable 14 to detect a signal from the optical fibre. In the event of the cable being cut, the optical path between the two ends 16, 20 of the cable 14 is broken. The optical signal emitted by the optical emitter is no longer received at the optical detector. The absence of an optical signal at the optical detector will be interpreted by the means for checking the integrity as a violation of the sealing device.

According to another embodiment of the invention, the core in the cable comprises an electrical conductor and the means for checking the integrity of the closure member comprises a first electrical terminal connected to the core at a first end of the cable and a second electrical terminal connected to the core at a second end of the cable. An electric current may be sent from one terminal to another. If the electric current is no longer able to travel from one terminal to the other the means for checking the integrity interprets this as a violation of the sealing device.

The first transponder 23 has a first identity and comprises means for receiving information from the means for checking the integrity of the cable, from the transponder reader 26 and from the microswitch 28. The first transponder 23 further comprises means for transmitting this information to a reading device.

A memory means (not shown) may further be arranged within the housing 12 of the sealing device to receive and store information from the means for checking the integrity of the cable, from the transponder reader 26 and from the microswitch 28. This information may then be forwarded to a reading device via the first transponder 23, when such a reading device comes within transmission range of the first transponder 23. A clock (not shown) may also be associated with the memory means for indicating when a particular event took place, thereby allowing to pinpoint the exact moment an event, e.g. a violation of the sealing device, has taken place.

The invention claimed is:

1. A sealing device comprising:

a housing and a closure member having a first end with a first connection pin received in the housing and a second end with a second connection pin received in the housing, at least one of said first and second ends being removably attached to said housing, said housing comprising means for checking integrity of said closure member and a first transponder for transmitting information on a status of the sealing device;

a second transponder associated with at least one of said first and second ends of said closure member, said second transponder comprising a second identity and being mounted to said first connection pin; and a transponder reader associated with said first transponder, said transponder reader being arranged for reading said second identity of said second transponder when said first connection pin is correctly installed in said housing;

wherein said first transponder is receiving said second identity from said transponder reader and for transmitting said second identity.

2. The sealing device according to claim 1, wherein said first transponder comprises a first identity, wherein said first transponder is configured for transmitting said first identity.

3. The sealing device according to claim 1, wherein said closure member comprises a flexible cable having a core therein.

4. The sealing device according to claim 3, wherein said core comprises an optical fiber and said means for checking the integrity of said closure member comprises an optical emitter arranged to emit an optical signal into the optical fibre and an optical detector arranged to detect a signal from the optical fibre.

5. The sealing device according to claim 3, wherein said core comprises an electrical conductor and said means for checking the integrity of said closure member comprises a first electrical terminal connected to the core at a first end of said cable and a second electrical terminal connected to the core at a second end of said cable.

6. The sealing device according to claim 1, wherein said housing comprises means for checking correct installation of said first and/or second end of said closure member.

7. The sealing device according to claim 6, wherein said means for checking correct installation comprises a micro switch.

8. The sealing device according to claim 1, wherein said housing further comprises memory means for recording data collected from said second transponder and/or said first transponder and/or said means for checking the integrity and/or said means for checking correct installation.

9. The sealing device according to claim 1, wherein said first end of said closure member is removably attached to said housing and said second end of said closure member is fixedly attached to said housing, said first end of said closure member comprising said second transponder.

10. The sealing device according to claim 1, wherein said first transponder is an active transponder.

11. The sealing device according to claim 1, wherein said second transponder is a passive transponder.

12. The sealing device according to claim 1, wherein said sealing device further comprises lock means for releasing at least one of the removably connected ends of the closure element from the housing.

13. The sealing device according to claim 1, wherein the first transponder comprises encryption and/or decryption means.

* * * * *